US008866909B2

(12) United States Patent
Bramoulle

(10) Patent No.: US 8,866,909 B2
(45) Date of Patent: Oct. 21, 2014

(54) DEVICE AND METHOD FOR THE SURVEILLANCE OF AN AIRCRAFT

(75) Inventor: Philippe Bramoulle, Muret (FR)

(73) Assignee: Airbus Operations SAS, Toulouse (FR)

( * ) Notice: Subject to any disclaimer, the term of this patent is extended or adjusted under 35 U.S.C. 154(b) by 1946 days.

(21) Appl. No.: 11/761,433

(22) Filed: Jun. 12, 2007

(65) Prior Publication Data

US 2008/0143832 A1 Jun. 19, 2008

(30) Foreign Application Priority Data

Jun. 13, 2006 (FR) ..................................... 06 52114

(51) Int. Cl.
*H04N 7/18* (2006.01)
*G08B 13/196* (2006.01)

(52) U.S. Cl.
CPC .................................... *G08B 13/196* (2013.01)
USPC ........... 348/152; 348/143; 348/148; 348/153; 348/154; 348/155; 348/164; 348/165; 340/425.5; 340/426.1; 340/426.26

(58) Field of Classification Search
None
See application file for complete search history.

(56) References Cited

U.S. PATENT DOCUMENTS 4,754,940 A 7/1988 Deter
5,642,029 A * 6/1997 Seragnoli ...................... 320/163
6,515,582 B1 * 2/2003 Teowee et al. ............. 340/426.1
6,545,601 B1 4/2003 Monroe
6,831,680 B1 12/2004 Kumler
7,376,037 B1 * 5/2008 Law et al. ..................... 365/226
2005/0030376 A1 2/2005 Terada et al.
2005/0128295 A1 * 6/2005 Addy ........................... 348/153

FOREIGN PATENT DOCUMENTS

| | | |
|---|---|---|
| DE | 200 11 914 | 1/2001 |
| EP | 0591585 | 4/1994 |
| EP | 0772169 | 5/1997 |
| FR | 2587678 | 3/1987 |
| GB | 2408166 | 5/2005 |

OTHER PUBLICATIONS

Zhi-Yan Cao et al., "An Image Sensor Node for Wireless Sensor Networks," School of Computer Science and Technology, Harbin Institute of Technology, Harbin, China, Apr. 4, 2005, pp. 740-745.

* cited by examiner

*Primary Examiner* — Thomas Dailey
*Assistant Examiner* — Nam Tram
(74) *Attorney, Agent, or Firm* — Oblon, Spivak, McClelland, Maier & Neustadt, L.L.P.

(57) ABSTRACT

The device comprises an intrusion detection module (6), an image acquisition module (14), an energy management module (13) and an autonomous power source (9), the said detection module (6) being designed to furnish a detection signal having a first predetermined state when an intrusion is detected and a second predetermined state otherwise, and the said management module (13) being designed to make the said device change over from a waiting mode to a working mode by activating the supply of the image acquisition module (14) by the said autonomous power source (9) when the said signal changes over from the second state to the first state.

The method includes a step consisting in furnishing the detection signal and, when the detection signal changes over from the second state to the first predetermined state, a step consisting in making the said device change over from the waiting mode to the working mode and a step consisting in achieving image acquisition.

15 Claims, 1 Drawing Sheet

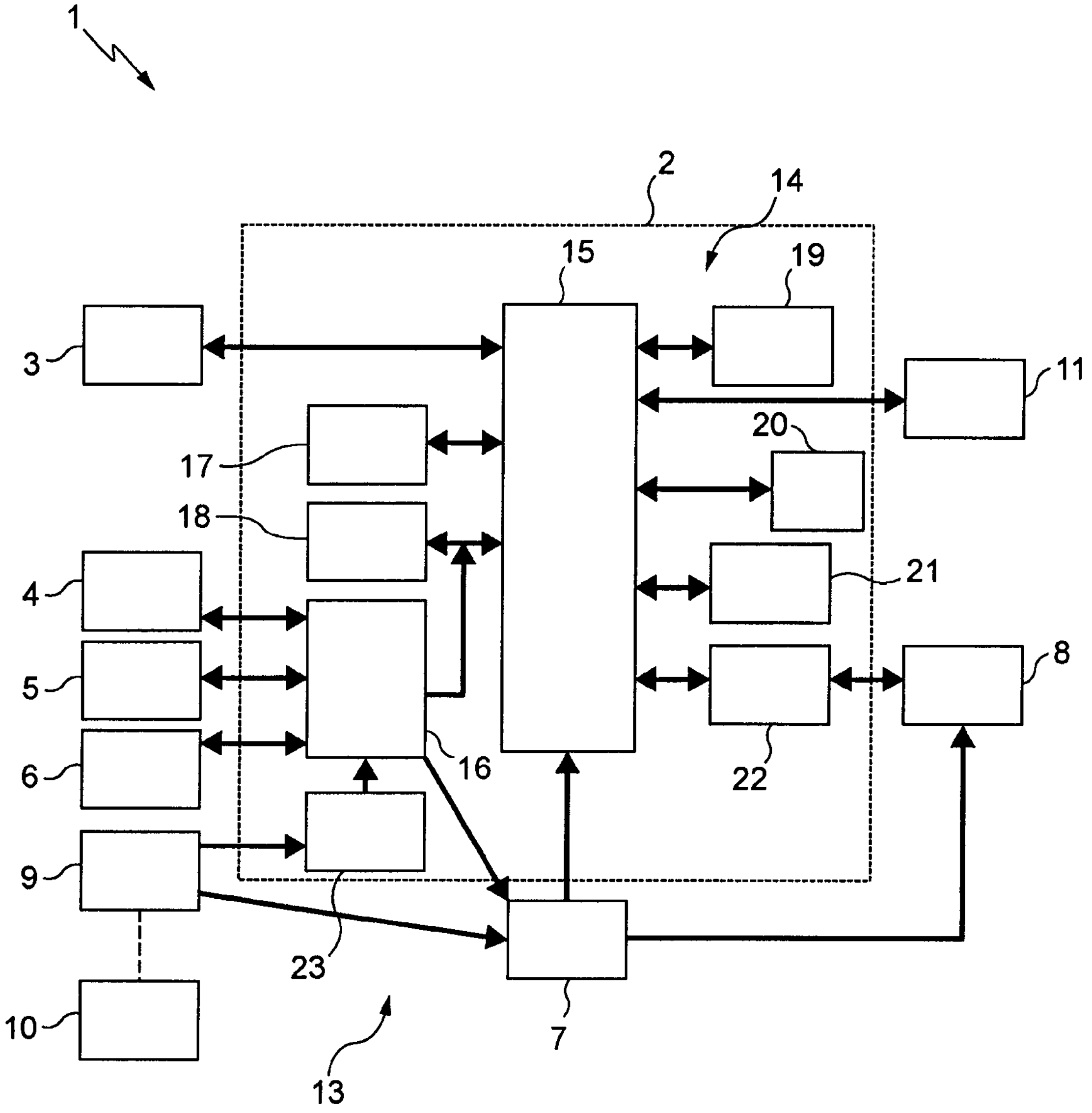
1
2
14
15
19
3
11
17
20
18
21
4
5
8
6
16
22
9
23
7
10
13

DEVICE AND METHOD FOR THE SURVEILLANCE OF AN AIRCRAFT

The present invention relates to a device and method for the surveillance of an aircraft.

Such a device makes it possible to detect the intrusion of an individual into an aircraft, in particular in the case in which this aircraft is parked in a location that is not being surveilled.

Surveillance devices designed to achieve acquisition of one or more images during an intrusion are already known.

The invention is aimed at providing a device that is both efficient and reliable. To this end, it proposes a device for the surveillance of an aircraft, characterized in that it comprises:

- an intrusion detection module;
- an image acquisition module;
- an energy management module connected to the said detection and acquisition modules; and
- an autonomous power source for the said modules;

the said detection module being designed to furnish the energy management module with a detection signal having a first predetermined state when an intrusion is detected and a second predetermined state otherwise, and the said management module being designed to make the said device change over from a waiting mode to a working mode by activating the supply of the image acquisition module by the said autonomous power source when the said detection signal changes over from the second state to the first predetermined state.

The use of an autonomous energy source makes it possible to not resort to the use of an airplane generator, which would necessarily have to be functioning in order to supply the device (thus causing large fuel consumption).

In addition, the energy management module is designed to permit energy consumption from the autonomous power source only when necessary and to the extent needed, by supplying the image acquisition module only if an intrusion is detected.

The surveillance device therefore remains operational over a long period.

The energy management module therefore makes it possible to optimize and significantly reduce the energy consumption of such a device, in order that the capacity and consequently the weight of the autonomous power source can be advantageously reduced, as is particularly advantageous in the aeronautics sector.

According to preferred characteristics, for reasons of simplicity and convenience of use:

- the supply to the image acquisition module is interrupted during the waiting mode;
- the said management module is also designed to make the said device change over from the working mode to the waiting mode by activating the interruption of the supply of the image acquisition module.

The interruption of the supply of the acquisition module during the waiting mode ensures zero energy consumption by this module in this mode (thus saving the battery as much as possible), while the changeover of the device from the working mode to the waiting mode (for example, once images have been acquired) makes it possible to save the battery until a subsequent intrusion is detected.

According to other preferred characteristics, for the same reasons as those indicated hereinabove:

- the energy management module is provided with a control circuit for the said supply of the image acquisition module, designed to change over from a waiting mode with low energy consumption to a working mode when the said detection signal changes over from the second state to the first predetermined state;
- the said control circuit is a programmable logic circuit of the CPLD type.

The management module is designed on the basis of a circuit (such as a CPLD circuit) capable of an operating mode with low energy consumption (waiting mode of the circuit), which contributes to reducing the total energy consumed by the device while remaining operational as regards detecting a possible intrusion and then changing over to its nominal functional mode (working mode).

In this way the battery energy is saved at the level of both the image acquisition module and the energy management module itself.

According to other preferred characteristics, for the same reasons as those indicated hereinabove, the image acquisition module is provided with a programmable logic circuit of the FPGA type.

The use of a programmable logic circuit of the FPGA type offers considerable calculating capacity with short response time, in particular during re-energization of the circuit when an intrusion is detected.

According to yet other preferred characteristics, the detection module is provided with a contactor.

The use of a contactor makes it possible to detect an intrusion simply and effectively without consuming electrical energy.

According to yet other preferred characteristics, the said autonomous power source of the said device is a battery separate from the main supply battery of the aircraft.

The device, equipped with a battery separate from the main battery of the aircraft (supplying the rest of the equipment items of the aircraft), is made energetically independent from the rest of the aircraft, thus avoiding any risk of discharge of the main battery of the aircraft, which could prevent the aircraft from being started up once again.

According to yet other preferred characteristics, the said battery is an NiMH battery.

The reduction of the capacity of the battery makes it possible to use a battery of the NiMH type (nickel metal hybrid) for the battery of the device. This type is specific to batteries of small dimensions, and this technology offers great charging capacity and makes it possible to meet the safety standards in force in the aeronautics sector, in particular by limiting the risk of toxic gas release (in contrast to batteries of larger dimensions and capacities, most often containing lead, which can be a source of toxic gas release).

According to yet other preferred characteristics:

- the said battery is connected to a generator of the aircraft;
- the said energy management module is provided with a switching means connected to the autonomous power source and to the image acquisition module, the said switching means being designed to occupy, in the working mode of the device, a first position in which the image acquisition module is electrically connected to the autonomous power source, and to occupy, in the waiting mode of the device, a second position in which the image acquisition module is electrically disconnected from the autonomous power source;
- the said image acquisition module is provided with a digital camera;
- the said image acquisition module is provided with a memory, in which the acquired images are stored; and/or
- the said device is also provided with a GSM telecommunications module designed to transmit an alarm signal when the said detection signal changes over from the second state to the first predetermined state.

In a second aspect, the invention is also aimed at a method for the surveillance of an aircraft, characterized in that it includes:

- a step consisting in furnishing, by means of an intrusion detection module, a detection signal having a first predetermined state when an intrusion is detected and a second predetermined state otherwise;
- and, when the said detection signal changes over from the second state to the first predetermined state, a step consisting, by means of an energy management module connected to the said detection module and to an image acquisition module, in making the said device change over from a waiting mode to a working mode by activating the supply of the image acquisition module by an autonomous power source; and
- a step consisting in achieving image acquisition by means of the said image acquisition module.

The explanation of the invention will now be continued by the detailed description of a practical example, given hereinafter by way of illustration but not limitation, based on a schematic diagram, illustrated in FIG. 1, of the surveillance device according to the invention.

Surveillance device 1 is constructed around a microcalculator 2, with which there are associated different peripherals, specifically a telecommunications means 3, a signaling means 4, a user interface 5, an intrusion detector 6, a switching means 7 and a digital camera 8.

Microcalculator 2 is supplied by a battery 9 and is connected to a communications network 11 capable of sending or receiving data (in this case the information network of the aircraft, such as an Ethernet network).

Digital camera 8 in this case is fixed in an aisle of the aircraft (such as the passenger aisle). It is also possible to fix this camera at other locations, such as in the compartment of a landing gear, in order to visualize the access to the shafts of the landing gear and to the tires (in order to detect the intrusion of a clandestine passenger).

This camera is in this case a Sony® camera sold under the reference SK-1004x.

This camera is associated with a system (not illustrated) for illuminating the zone to be filmed and mounted on a single block together with the camera.

Contact detector 6 is in this case a directly attached magnetic opening detector disposed, for example, against a door of the aircraft (which an intruder would have to open to gain access to the surveilled aisle), to detect whether the door is open or closed.

Telecommunications means 3 is in this case a GSM system equipped with an antenna.

Signaling means 4 consists of a plurality of indicator lights (low-consumption diodes in this case), by means of which the state of the device can be identified (charge level of battery 9, indication of a battery charging phase, indication of the presence of a recording stored in a memory of the microcalculator, etc.).

Battery 9 is an NiMH battery (in this case from the manufacturer FAST®, sold under the reference VHD9005) separate from the airplane's main battery, which supplies the other equipment items of the airplane. The only function of battery 9 is to supply the elements of device 1 autonomously and independently. This battery is connected to a generator 10 of the airplane and is recharged when the generator is functioning (for example, during restart of the airplane).

Microcalculator 2 is provided with two logic circuits 15 and 16 connected to one another as well as with a random access memory (RAM) 17, a non-volatile memory 18, a clock 19, a mobile memory 20, a video compression circuit 21, a video decoding circuit 22 and an interface 23 with battery 9.

Camera 8 is connected directly to switching means 7 and is connected to circuit 15 of microcalculator 2 via video decoding circuit 22.

Memory 20 is in this case a mobile memory, but it can have other forms, provided that this memory is non-volatile, so that it can conserve the stored data even when it is not energized (for example, an EEPROM or flash memory or even a hard disk).

Circuits 15 and 16 are two Xilinx® circuits, the first being sold under the reference XC3S2000-4FG6761 and the second under reference XC2C128-7VQ100I.

Programmable circuit 15 is a circuit of the FPGA type ("field programmable gate array", a network of gates that can be programmed in situ) connected to memories 17, 18 and 20, to clock 19, to network 11, to compression and decoding circuits 21 and 22, to the telecommunications means via GSM 3 and to switching means 7.

Such a circuit based on FPGA logic has the advantage of guaranteeing a very short response time (less than one second), for example while it is being energized (in contrast to a processor that would be associated with an operating system), while also offering the large calculating capacity necessary here for processing video images.

Together with video compression and decoding circuits 21 and 22, memory 20 and camera 8, this circuit forms an assembly 14 making it possible to obtain sequences of digital images and to record them in memory 20.

Programmable circuit 16 is a circuit of CPLD type ("complex programmable logic device", a complex programmable logic circuit) connected to signaling means 4, to user interface 5, to detector 6 as well as to battery 9 via interface 23, to non-volatile memory 18 and to circuit 15.

This circuit has an intermediate functional mode with low energy consumption (waiting mode) between the state of zero consumption (Off) and the nominal On functioning state (working mode of the circuit).

The circuit is maintained in this intermediate waiting mode as long as it does not receive any wakeup call from one of its input signals.

When a wakeup call is received, the circuit then changes back over to its working mode (which consumes more energy). Conversely, the circuit changes back over to the waiting mode with low energy consumption (low power consumption, lower than the power consumed in nominal mode) if it does not receive any signal during a predefined period.

Together with switching means 7 and interface 23, this circuit 16 forms an assembly 13 designed to manage the energy of the battery.

Interface 23 makes it possible to transmit, to circuit 16, information on the state of the battery and in particular on its charge level, so that circuit 16 can, for example, cause an indicator light of signaling means 4 to glow if this level is low.

The different functional modes of the surveillance device will now be described.

The device is designed to function in three functional modes, which can be preselected by the user by means of interface 5.

This interface in this case consists of a pushbutton, which the user depresses to change over from one mode to another.

In a first "sleep" mode, only circuit 16 and signaling means 4 are supplied by battery 9, while switching means 7 is instructed to occupy a position in which the other elements of the device are disconnected from the battery and their supply is therefore interrupted (in particular circuit 15, memories 17, 18 and 20, circuits 21 and 22 as well as camera 8 and its illumination system, which is a particularly heavy energy consumer).

This mode is the default mode occupied by microcalculator 2 during its initialization (first energization or re-energization after complete discharge of the battery).

Signaling means 4 remains supplied in order to furnish visual indications about the state of the device (charge level of the battery, indication of a battery charging phase, indication of the presence of a recording in the mobile memory, etc.) and circuit 16 remains supplied to detect whether the user is changing modes.

Circuit 16, although supplied, is then in its waiting mode.

In this mode, the device is therefore particularly economical in terms of energy, since only circuit 16 and signaling means 4 are being supplied, and circuit 16, in the absence of wakeup signals, is in its mode of lowest consumption (intermediate waiting mode described hereinabove).

The second functional mode of the device is a maintenance mode. In this mode, the device is not ready to make a recording ("non-armed" mode), but all the elements are being supplied in order that operations of verification of the functioning of the device, of software maintenance or of uploading of data can be achieved.

When circuit 16 detects an instruction from pushbutton 5 to change over from "sleep" mode to "non-armed" mode, this circuit 16 changes over from its waiting mode to its working mode to instruct means 7 to switch in order to connect electrically, to battery 9, all of the elements of the device that were not being supplied.

This "non-armed" mode therefore makes it possible, for example, to update if necessary the program contained in non-volatile memory 18 from data contained in mobile memory 20 or else to transmit, via Ethernet network 11 or telecommunications means 3, all or part of the video images possibly stored in that memory.

If no maintenance or uploading operation has taken place within a determined time (calculated with clock 19), circuit 15 indicates to circuit 16 that the device is again available to return to sleep mode, in order to save the energy of the battery as much as possible.

Circuit 16 then instructs means 7 to interrupt the supply of the elements whose functioning was interrupted in sleep mode.

Only circuit 16 and signaling means 4 then remain supplied.

Once circuit 16 has instructed the supply of the other elements of the device to be interrupted, it returns to its waiting mode.

The third selectable mode is the operational functioning mode of the device ("armed" mode, in which the device is ready to record images if an intrusion is detected).

This mode has a first surveillance state ("waiting armed" mode, which consumes little energy) as long as no intrusion is detected by intrusion detector 6 (corresponding to the state "presence of a contact" at this detector) and a second alarm state ("working armed" mode) when such an intrusion is detected (corresponding to the state "absence of contact" at detector 6).

In the waiting armed mode, as for the sleep mode, a minimum number of elements is supplied, so as to reduce the energy consumed by the device as much as possible, apart from the fact that in this case signaling means 4 is not supplied (diodes dark), in order to make this device as unobtrusive as possible and less easily noticeable by a possible intruder.

Only circuit 16 is therefore supplied and is in its waiting mode, ready to change over to its working mode upon change of state of contactor 6.

The device then has a consumption substantially equal to or even slightly less than that of the previously described sleep mode, thus contributing to the increase of functioning time of the device under totally autonomous conditions (supplied only by battery 9).

When an intrusion is detected (opening of the contactor forming intrusion detector 6), the device changes over from waiting armed mode (surveillance state) to working armed mode (alarm state), in which circuit 16 returns to its nominal working mode to instruct means 7 to switch, in order to supply all of device 1 again (in particular the elements of image acquisition assembly 14) and to begin a video recording.

Now that circuit 15 is being supplied once again, it loads the program contained in memory 18 upon instructions of circuit 16, in order to instruct camera 8, itself now re-energized, to start the recording. The video data are then transmitted to circuit 15 by decoder 22 and compressed by video compressor 21, finally being recorded in mobile memory 20.

Simultaneously with the recording, GSM means 3 sends, via the wireless telephony network, an alarm signal as well as one or more of the recorded images, in order to alert, for example, a person in charge of the zone in which the airplane is parked.

At the end of a time chosen in advance by the user, the recording is stopped and circuit 15 signals the end of this recording to circuit 16, so that circuit 16 instructs means 7 to switch, in the absence of a new intrusion, in order to permit the device to return to its waiting armed mode and in turn to save the energy of the battery.

Circuit 16 then also returns to its waiting mode.

The joint use of FPGA circuit 15 and of CPLD circuit 16 therefore makes it possible to benefit from the large calculating capacities of circuit 15 when it is being supplied, while minimizing the energy consumed by means of circuit 16, on the one hand because this circuit (which is continuously supplied at all times) consumes little (by virtue of its waiting mode with low consumption) and on the other hand because it is programmed to instruct circuit 15 (a heavy energy consumer because of its large calculating capacities) to be supplied only when necessary.

When at least one recording is stored in mobile memory 20, and when the sleep or "non-armed" mode is selected by the user, an indicator light of signaling means 4 glows to inform the user of the presence of a recording.

Whenever a new intrusion is detected, a new recording is stored in the memory after the preceding recordings. The return to the surveillance state ("waiting armed" mode) after each recording makes it possible to save the energy of the battery between each recording phase.

The energy savings achieved in this way makes it possible to prolong the functioning time of the device on the basis of an autonomous energy source such as a battery.

It also is made possible in this way to use batteries of smaller capacities, which are significantly more lightweight and for which technologies (NiMH or Li ion) different from those of heavy conventional batteries having large capacities (lead technology) can therefore be used.

Without such energy savings (continuous supply of device 1), surveillance of an aircraft for a duration of 24 hours would necessitate a battery of 35 ampere-hours (Ah), which corresponds to a weight of approximately 15 kg, whereas with the present device the surveillance is operational (that is, capable of recording images if an intrusion is detected) for a duration of as long as two months with an internal battery 9 of 1 Ah weighing only 500 g, i.e., a significant advantage in autonomy and in weight.

In an alternative embodiment, camera 8 is capable of filming in the infrared and is associated not with a system illuminating in the visible spectrum but with an infrared illuminating system making it possible to film with complete secrecy (in particular at night).

In yet another alternative embodiment, such a device is provided not with one camera but with a plurality of cameras disposed at different angles of view.

In another alternative embodiment, camera 8 is replaced by a digital photographic apparatus designed to take one or more photos when an intrusion is detected.

In yet another alternative embodiment, contactor 6 is replaced by a motion detector supplied by battery 9.

The present invention is not limited to the embodiment described and illustrated, but encompasses every variant of execution.

The invention claimed is:

1. A device for the surveillance of an aircraft, comprising:
- an intrusion detection module;
- an image acquisition module;
- an energy management module connected to the intrusion detection and image acquisition modules; and
- an autonomous power source that supplies power to the intrusion detection module, the image acquisition module and the energy management module, wherein
- the intrusion detection module is configured to furnish the energy management module with a detection signal having a first predetermined state when an intrusion is detected and a second predetermined state otherwise,
- the energy management module is configured to make the device change over from a waiting mode to a working mode by activating the supply of power, from the autonomous power source, to the image acquisition module when the detection signal changes over from the second predetermined state to the first predetermined state, and
- the energy management module includes a Complex Programmable Logic Device (CPLD) control circuit, the CPLD control circuit being configured to
  - control the supply of power to the image acquisition module, and
  - change over from a waiting mode with low energy consumption to a working mode when the detection signal changes over from the second predetermined state to the first predetermined state, the waiting mode with low energy consumption being an intermediate functional mode between a state of zero consumption and the working mode, and
- in the waiting mode, only the CPLD control circuit is supplied with power.

2. The device according to claim 1, wherein the supply of power to the image acquisition module is interrupted during the waiting mode.

3. The device according to claim 2, wherein the energy management module is configured to make the device change over from the working mode to the waiting mode by activating the interruption of the supply of power to the image acquisition module.

4. The device according to claim 1, wherein the image acquisition module includes a Field Programmable Gate Array (FPGA) control circuit.

5. The device according to claim 4, further comprising a switch, the switch being directly connected to the autonomous power source, the CPLD control circuit and the FPGA control circuit, and the autonomous power source is connected to the CPLD control circuit via an interface.

6. The device according to claim 1, wherein the detection module includes a contactor.

7. The device according claim 1, wherein the autonomous power source is a battery separate from a main supply battery of the aircraft.

8. The device according to claim 7, wherein the battery is a NiMH battery.

9. The device according to claim 1, wherein the battery is connected to a generator of the aircraft.

10. The device according to claim 1, wherein the energy management module includes a switching element connected to the autonomous power source and to the image acquisition module, the switching element being configured to occupy, in the working mode of the device, a first position in which the image acquisition module is electrically connected to the autonomous power source, and to occupy, in the waiting mode of the device, a second position in which the image acquisition module is electrically disconnected from the autonomous power source.

11. The device according to claim 1, wherein the image acquisition module includes a digital camera.

12. The device according to claim 1, wherein the image acquisition module includes a memory, in which the acquired images are stored.

13. The device according to claim 1, further comprising a GSM telecommunications module configured to transmit an alarm signal when the detection signal changes over from the second state to the first predetermined state.

14. A method for surveillance of an aircraft, comprising:
- furnishing, by an intrusion detection module, a detection signal having a first predetermined state when an intrusion is detected and a second predetermined state otherwise;
- making, by an energy management module connected to the intrusion detection module and to an image acquisition module when the detection signal changes over from the second predetermined state to the first predetermined state, a device change over from a waiting mode to a working mode by activating the supply of power, from the autonomous power source, to the image acquisition module;
- achieving image acquisition by the image acquisition module; and
- controlling, by a control circuit of the energy management module, the supply of power to the image acquisition module,
- wherein the control circuit is a Complex Programmable Logic Device (CPLD) control circuit, the CPLD control circuit being configured to change over from a waiting mode with low energy consumption to a working mode when the detection signal changes over from the second predetermined state to the first predetermined state, and the waiting mode with low energy consumption being an intermediate functional mode between a state of zero consumption and the working mode, and
- wherein, in the waiting mode, only the CPLD control circuit is supplied with power.

15. The method according to claim 14,
- wherein the image acquisition module includes a Field Programmable Gate Array (FPGA) control circuit,
- wherein a switch is directly connected to the autonomous power source, the CPLD control circuit and the FPGA control circuit,
- wherein the autonomous power source is connected to the CPLD control circuit via an interface, and wherein said controlling the supply of power to the image acquisition module is based on operation of the switch.

* * * * *